Figure 3:
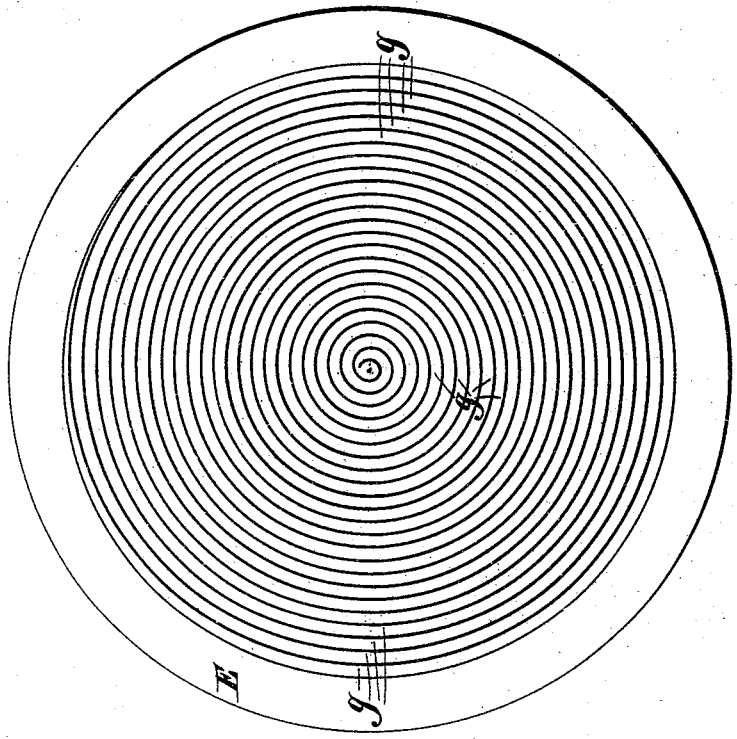

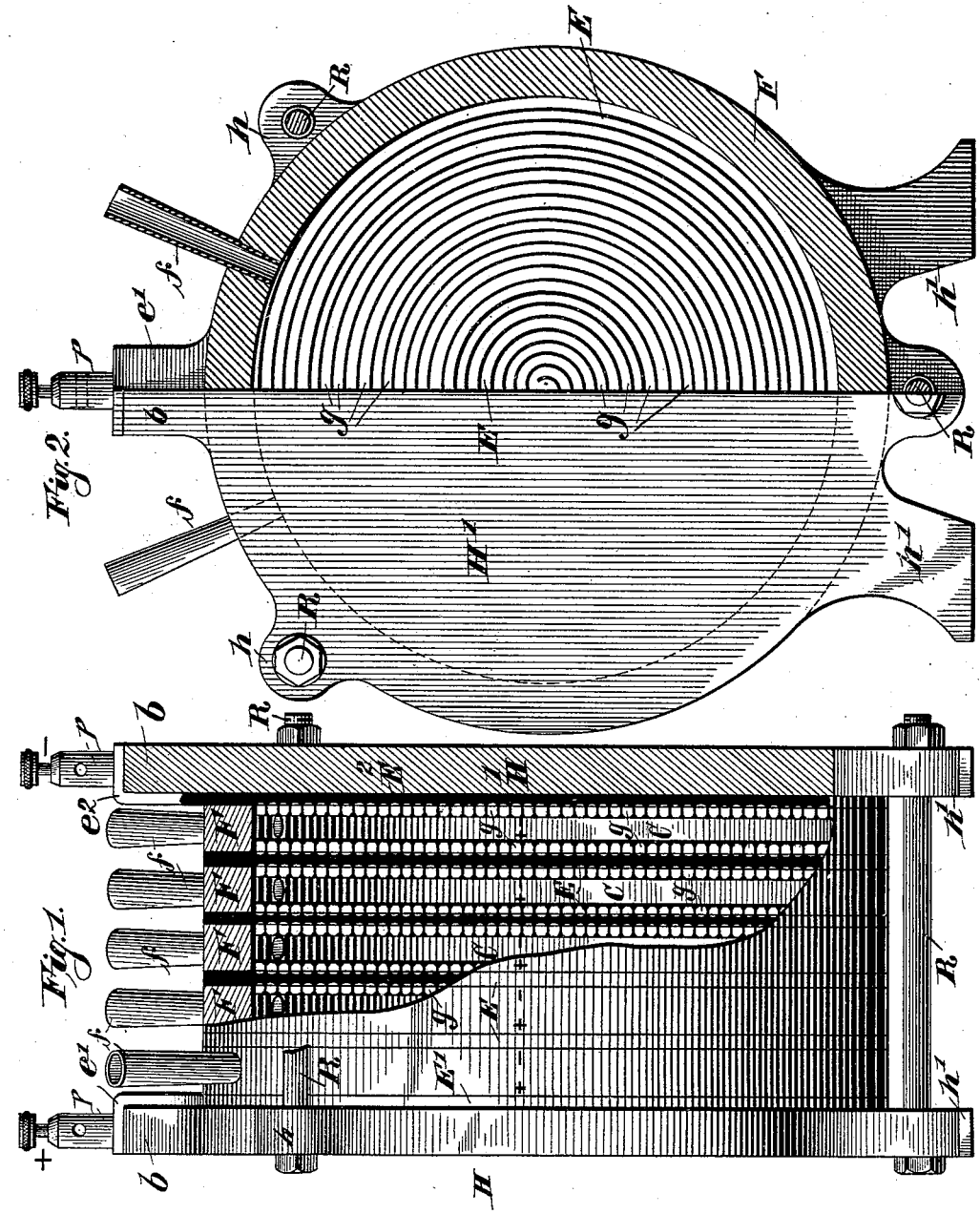

(No Model.) 2 Sheets—Sheet 2.

N. WLADIMIROFF.
SECONDARY BATTERY.

No. 488,726. Patented Dec. 27, 1892.

Witnesses:
H. S. Dieterich
B. W. Sommers

Inventor:
Nicholas Wladimiroff,
By Henry Orth
Atty.

UNITED STATES PATENT OFFICE.

NICHOLAS WLADIMIROFF, OF ST. PETERSBURG, RUSSIA.

SECONDARY BATTERY.

SPECIFICATION forming part of Letters Patent No. 488,726, dated December 27, 1892.

Application filed July 7, 1892. Serial No. 439,244. (No model.)

*To all whom it may concern:*

Be it known that I, NICHOLAS WLADIMIROFF, a subject of the Emperor of Russia, residing at St. Petersburg, Russia, have invented certain new and useful Improvements in Secondary Batteries; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to electric batteries and more particularly to secondary or storage batteries or accumulators, and it has for its object to increase the efficiency, simplify the construction, and reduce the bulk and weight of these batteries.

The invention consists essentially in the general construction of the battery, and arrangement of its elements; in the use of electrodes whose opposite surfaces are of like chemical character or nature but of unlike polarity, the same electrode forming the positive pole of one cell and the negative pole of an adjacent cell; in the construction of the electrodes, and in minor structural features, as will now be fully described reference being had to the accompanying drawings, in which—

Figure 1 is a sectional side elevation, and Fig. 2 a similar end elevation of a secondary or storage battery embodying my invention.
Fig. 3 is a face view of one of the electrodes.

The battery consists essentially of two heads or head plates, H, and H', of a series of frames, F, each preferably provided with two feed apertures for the reception of glass feed funnels, $f$, for supplying the acid solution, and a series of electrodes, E, of which there is one between each two frames, F, whereby the cells, C, are formed, the initial and terminal electrodes, E' E², of the series being secured between the corresponding frames and the heads, H, and H', respectively, against which latter they bear, the whole being firmly united by means of tie rods, R, connected with said heads, the latter being provided with suitable perforated lugs or ears, $h$. The heads, H, and H', and the frames, F, are constructed, as will be readily understood, of a non-conductive and acid proof material of any desired or preferred kind. The electrodes, E, E', E², have both of their opposite surfaces of like chemical nature or character, and with the exception of the initial and terminal electrodes, E', E², have a spiral groove formed in their opposite faces, said electrodes, E', E², having such a groove formed in their inner faces only, for obvious reasons.

The object of providing the electrode surfaces with a spiral groove is for the better retention of the active material or paste. Various means have heretofore been proposed with a view to preventing the active material from scaling off the electrodes, none of which are, however, as efficient as the spiral groove whereby said active material is formed into a spiral column provided with a continuous or unbroken support, and whereby the active surface of the electrode is materially increased.

As shown in Fig. 3, the groove, $g$, is formed within a marginal space of a width equal to that of the frames, leaving a smooth surfaced rim that is clamped between said frames. The initial and terminal electrodes, E', E², are each provided with an extension or arm, $e'$, $e^2$, respectively, whose outer ends are bent at right angles and secured to a boss, $b$, projecting from the heads, H, and H', by means of suitable binding posts, $p$, through which the said electrodes, E', and E², are connected up. It is obvious that if an electric current passes through such a battery the opposite faces of the diaphragm electrodes will form opposite poles, that is to say, their opposite faces will be of unlike polarity, unlike poles facing each other in the cells formed by and between said electrodes. Now if, for instance, the electrodes are made of lead and a sulphuric acid solution is employed, peroxide of lead will be formed on one side or face of the electrodes, while the acting material, or the metallic lead of the opposite side or face of the electrode will be reduced to lead sponge.

The several parts of the battery may have any desired configuration, though I prefer the cylindrical form as more convenient and less bulky, while such a battery can be more readily transported and handled. On the other hand, the cylindrical form affords a better means for preventing the spilling out of the acid solution by locating the feed funnels, $f$, at points proximate to the highest point of the battery frames, F, as shown or at said highest point when but one such funnel is provided in each frame. To these ends the heads, H, and H′, are made discoidal, and the frames, F, cylindrical, as shown. My improved battery possesses, however, still more important advantages, the principal ones being economy, especially with currents of great strength; a reduction of the resistance to the passage of the electric current; great lightness as compared with other batteries of this kind and of a corresponding electrical energy; the acting material is formed readily and with great regularity because the current passes through every portion of the electrode at the same time instead of entering the same at one end and leaving it at the other, as is the case with all storage batteries with which I am acquainted. Furthermore, all metallic connections between the electrodes are avoided, so that there are no projections on the exterior surface of the battery, which is a perfectly smooth-faced cylinder, whereby liability to injury is reduced to a minimum, and the handling and transportation greatly facilitated; and since each of the electrodes is firmly held at every point of its contour their warping or buckling is effectually prevented and all danger of short circuiting is avoided. Finally, when a sulphuric acid solution is employed in conjunction with lead electrodes there is no formation of dirt while the battery when once charged may be kept for an indefinite time without loss of energy.

The number of electrodes and their active surface will of course vary according to the work to be performed by the battery, and is determined in a well-known manner.

In the drawings I have shown the discoidal heads, H, and H′, as provided with feet, $h'$, to support the battery in a horizontal position, but it is readily apparent that the battery may be arranged in a vertical position, i. e., set on end.

Having thus described my invention, what I claim as new therein and desire to secure by Letters Patent, is:—

1. In a secondary battery, electrodes whose opposite faces are of like chemical character or nature but of unlike polarity and provided with a spiral face groove.

2. A secondary battery comprising a series of elements formed by frames of non-conductive material and electrodes whose opposite faces are of like chemical character or nature but of unlike polarity interposed between said frames, said electrodes being provided with a spiral face groove.

3. A cylindrical secondary battery comprising a series of elements formed by discoidal heads provided with a supporting base or foot, circular frames, and discoidal lead electrodes provided with a spiral face groove interposed between the frames and between the end frames and heads, means for connecting up the initial and terminal electrodes of the series, means for supplying an acid solution to the cells, and clamping rods connecting the two heads, substantially as and for the purpose set forth.

4. A lead electrode for secondary batteries provided with a spiral face groove.

5. A secondary battery composed of a series of elements formed by two heads provided with bosses or projections, a series of frames, a lead electrode interposed between each two frames and provided with a spiral groove in its opposite faces, a lead electrode provided with a spiral groove in its inner face and with an arm or extension interposed between the opposite end frames and the heads, said extension of the electrode being secured to the boss by a binding post, one or more feed apertures formed in each of the frames, and clamping rods connecting the heads, substantially as and for the purpose set forth.

In testimony whereof I have signed my name to this specification in the presence of two subscribing witnesses.

NICHOLAS WLADIMIROFF.

Witnesses:
F. KAUPE,
N. TSCHEKALOFF.